G. R. O'BRIEN.
LOCK FOR WHEELS OF AUTOMOBILES AND OTHER VEHICLES.
APPLICATION FILED NOV. 24, 1916.
1,359,419.
Patented Nov. 16, 1920.
2 SHEETS—SHEET 2.
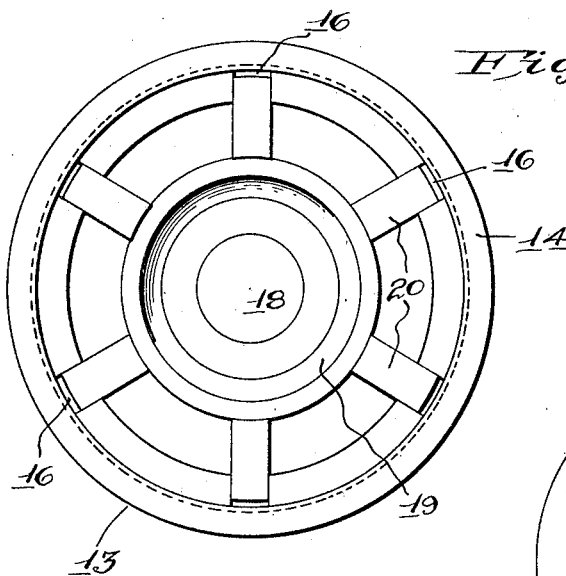
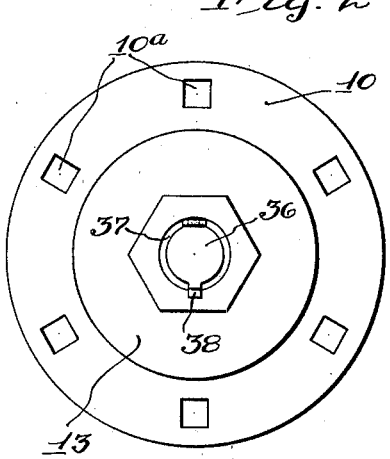
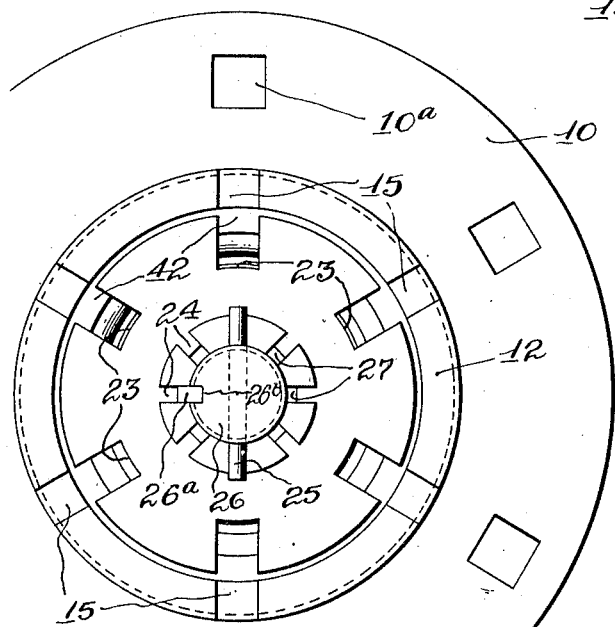
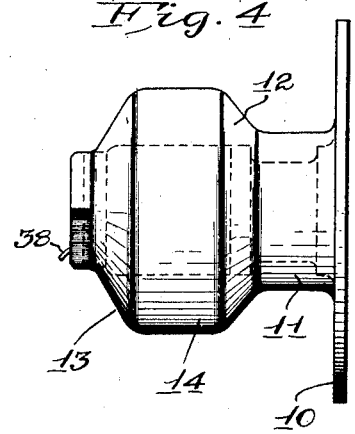
Inventor
Gerald R. O'Brien
by John E. Stryker Atty.

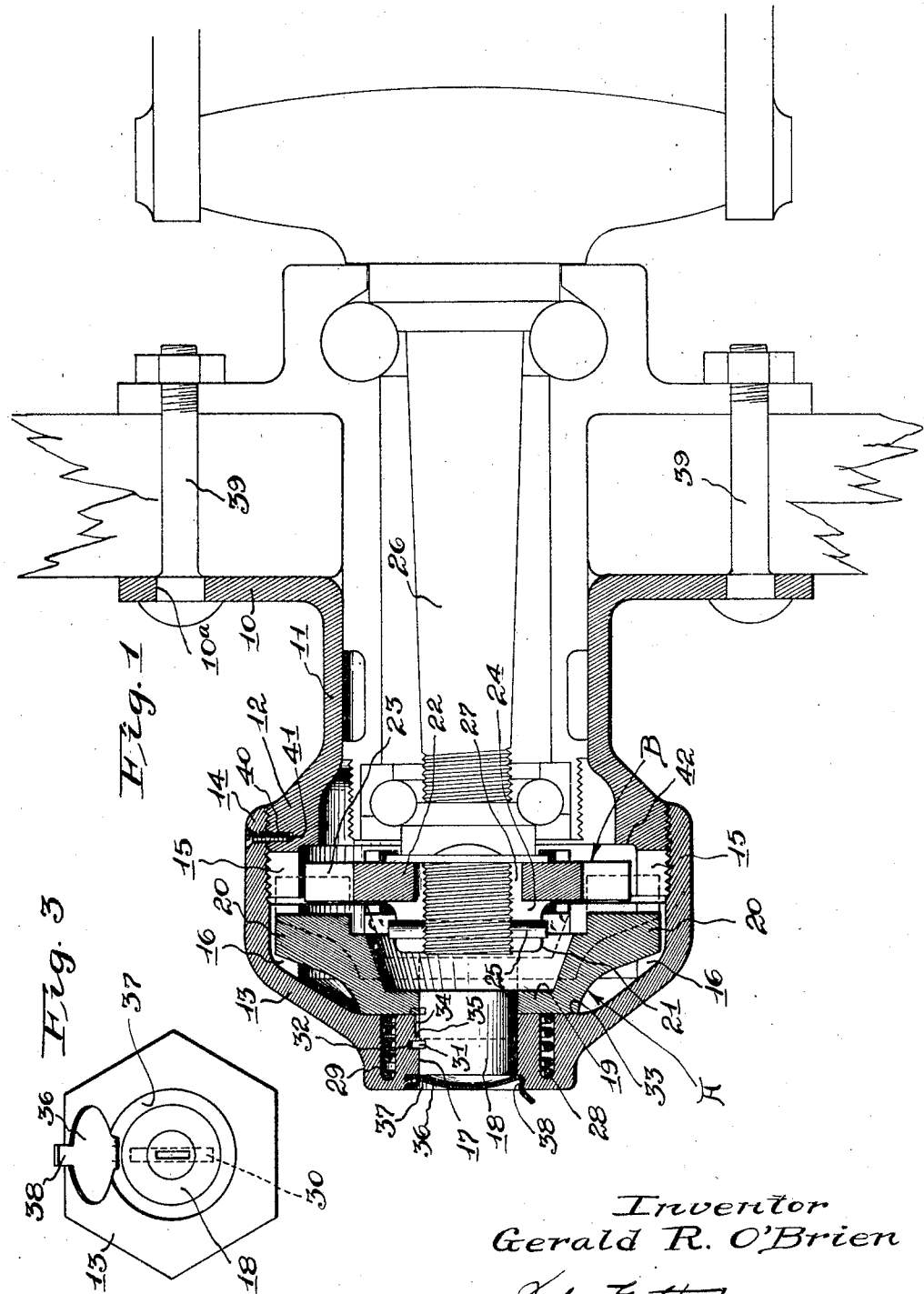

UNITED STATES PATENT OFFICE.

GERALD R. O'BRIEN, OF ST. PAUL, MINNESOTA.

LOCK FOR WHEELS OF AUTOMOBILES AND OTHER VEHICLES.

1,359,419.  Specification of Letters Patent.  Patented Nov. 16, 1920.

Application filed November 24, 1916. Serial No. 133,146.

*To all whom it may concern:*

Be it known that I, GERALD R. O'BRIEN, a citizen of the United States, residing at St. Paul, in the county of Ramsey and State of Minnesota, have invented new and useful Improvements in Locks for Wheels of Automobiles and other Vehicles, of which the following is a specification.

Its object is to provide a simple, durable and efficient key-controlled device designed to be readily fitted upon the usual wheel and journal spindle of an automobile and adapted to rigidly engage the former with the latter; thus preventing the rotation of the wheel and thereby protecting the vehicle from unauthorized use.

A further object is to provide such a device composed of parts adapted to be substituted for the ordinary hub-plate and hub-cap of an automobile wheel and when so substituted to serve in lieu of the removed parts and also as a lock.

These and other objects will more fully hereinafter appear.

In the drawings, Figure 1 is a longitudinal central sectional view of a device embodying my invention and illustrates the same as applied to an automobile wheel; Fig. 2 is an end elevation thereof; Fig. 3 is a similar elevation in detail, showing the lock, a key (dotted lines) inserted in said lock, and the dust-cap for said lock turned back to permit the insertion of said key; Fig. 4 is a side elevation of my improved device and shows in dotted lines a conventional hub-cap which is replaced by said device; Fig. 5 is an end view of the body portion of my hub-cap and also illustrates the fixed clutch member as attached to the end of a spindle; and Fig. 6 is an end view of the removable cover for said hub-cap and shows in elevation the sliding clutch member carried by said cover.

Referring to the drawings, it will be seen that my improved lock consists essentially of a hub-cap adapted to be secured to the hub of a wheel, a fixed clutch member designed to be rigidly secured to the journal spindle and a slidable clutch member carried in said hub-cap and adapted to engage said fixed clutch member. The body of the hub-cap comprises a circular hub-plate 10 having a central cylindrical extension 11 enlarged at its end to form an annular head 12, and said body is supplied with a cover 13 having an annular flange 14 threaded internally and adapted to fit over the head 12 which is also threaded externally to receive said flange. The rim of the annular head 12 has radial recesses 15 cut therein and these recesses register with grooves 16 formed in the inner periphery of the flange 14 in said cover 13. Extending axially through the cover 13 is a bore 17 which contains a barrel 18 slidably fitted therein. This barrel forms a mounting for the slidable clutch member A which consists of a dish-shaped body 19 having radial lugs 20 projecting from the rim thereof and extending into the grooves 16 in the cover 13. Said clutch member A is perforated axially to receive the end of the barrel 18 and is shrunk upon said barrel or otherwise suitably secured thereto. I provide a fixed clutch member B which is secured upon the end of the journal spindle to which the hub-cap is attached. The fixed clutch member preferably comprises a nut 21 formed with an annular enlargement 22 having radial notches 23 in the edge thereof, said notches being arranged to register with the recesses 15 in the hub-cap in predetermined positions of the wheel. This fixed clutch member B occupies the position and performs the usual functions of the lock nut ordinarily employed on the end of a spindle. The nut 21 is accordingly slotted at 24 to receive the usual lock-pin 25 which passes transversely through the spindle 26. To strengthen this connection between the clutch member B and spindle, I provide ways 27 in the nut 21 which communicate with said slots 24; said ways being adapted to severally receive a feather 26$^a$ which is seated in the usual longitudinal way 26$^b$ in said spindle. It will be noted here that the clutch member B may, within the scope of my invention, be otherwise suitably secured upon the journal spindle 26. As above described, the grooves 16 in the cover 13 and the recesses 15 in the body portion of the hub-cap register continuously and the notches 23 in said fixed clutch member B register with said recesses 15 in certain positions of the wheel. It is, therefore, apparent that, in several positions of the wheel upon the spindle, each notch 23 in the clutch member B registers with one set of said continuously registering grooves 16 and recesses 15, at which times the sliding clutch member A may be shifted toward the fixed clutch member, the lugs 20 passing partially from said grooves 16 and into said recesses 15 and notches 23. The lugs 20 in this position lock the body of the hub-cap against rotation with respect to the spindle 26 and also secure the cover 13 against rotation upon the head 12 of said hub-cap.

I provide a coiled spring 28 seated in an annular recess 29 in the cover 13 and bearing against the slidable clutch member A to shift said clutch member and engage it with the fixed clutch member B, and I employ a key 30 to return said clutch member A, said key being adapted to actuate suitable locking mechanism within the barrel 18 which is designed to secure the slidable clutch member in open and closed positions. This locking mechanism includes a spring-pressed latch-bolt 31 which rests in a depression 32 in the periphery of the bore 17 in the cover 13 and secures the clutch member A in open position against the action of the spring 28. Said latch-bolt 31 also engages the shoulder 33 in said cover (dotted lines Fig. 1) when the clutch is closed and prevents the withdrawal of the clutch member A without the use of the key. It will be noted that the lugs 20 will not pass into the notches 23 of the clutch member B unless the recesses 15 in the hub-cap register with said notches 23. To avoid the necessity of moving the vehicle to obtain such registration, I arrange the clutch members A and B so that the former when released from open position may move a slight distance before the lugs 20 strike the annular enlargement 22 on the fixed clutch member B. If an attempt is now made to move the vehicle it is arrested by the closing of the clutch when registration between recesses 15 and the notches 23 occurs. To prevent meddlers with improvised appliances from shifting and latching the clutch member A in open position when the clutch has failed to close for want of registration between the recesses 15 and notches 23, I form a second depression 34 in the wall of the bore 17 which extends from the inner end of the bore to a point near the first-mentioned depression 32. The shoulder 35 at the end of said depression 34 engages the latch bolt 31 unless entirely withdrawn by means of a key and prevents sufficient return movement of the clutch member A to permit the latching of the same in open position. To exclude dust and to otherwise protect the locking mechanism within the barrel 18, I provide a closure 36 which is hinged within an enlargement 37 of the bore 17 and yieldingly held in closed position by the clip 38 thereon.

In applying my wheel lock, the body portion of the hub-cap is secured to one of the front wheels of a vehicle by the usual bolts 39 which pass through openings 10ª in the hub-plate 10. The clutch member B is then threaded upon the end of the spindle and secured against rotation thereon by means of the pin 25 and feather 26ª. The cover 13 is finally threaded upon the head 12 of the hub-cap, care being taken that registration is secured between the grooves 16 in the cover and the recesses 15 in said head. To insure such alinement, I provide a gage consisting of a screw 40 which passes through the flange 14 on the cover 13 and is threaded in a bore 41 in the body of the hub-cap. This screw is not depended upon to prevent the removal of the cover, since when the clutch is closed, the lugs 20 on the slidable clutch member A preclude the turning of said cover B with respect to the body portion of the hub-cap. It will be seen, therefore, that the cover 13 is securely protected against removal when the clutch is closed, and it will be further noted that the hub-cap is secure against removal from the wheel. This latter safeguard is effected by the provision of the annular shoulder 42 within the body portion of the hub-cap which strikes the fixed clutch member B before the lugs 20 can be disengaged therefrom in case an attempt is made to remove the hub-cap after withdrawing the bolts 39 from the wheel.

The simplicity, durability and efficiency of my improved wheel lock are obvious. The structure and arrangement thereof permit of a design similar to the usual hub-cap which it replaces. When this device is applied to an automobile as an attachment, machine work and the consequent weakening of parts is avoided, and when constructed as a part of a vehicle, it takes the place of certain parts otherwise necessary.

Having described my invention, what I claim as new and desire to protect by Letters Patent is:

1. In a device of the class described, the combination with a wheel and journal spindle, of a hub-cap on said wheel, a clutch member rigidly secured upon said spindle within the hub-cap, and a slidable clutch member fixed against rotation within said hub-cap and adapted to engage said rigid clutch member.

2. In a device of the class described, the combination with a wheel and a journal spindle, of a hub-cap on said wheel and a clutch inclosed within said hub-cap, adapted when closed to rigidly connect said wheel and spindle and prevent the relative rotation thereof.

3. In a device of the class described, the combination with a wheel and journal spindle, of a clutch member fixed against rotation on said spindle, a hub-cap on the wheel inclosing said clutch member, a slidable coacting clutch member within said hub-cap secured against rotation with respect thereto, and a key-controlled mechanism also within the hub-cap to lock said slidable clutch member in positions in and out of engagement with said first-mentioned clutch member.

4. In a device of the class described, the combination with a wheel and journal spindle, of a hub-cap comprising a body adapted to be secured to the hub of the wheel and a cover threaded on said body, a rigid clutch member attached to said journal spindle and a second clutch member slidable axially in said cover and adapted when engaged with said rigid clutch member to lock the body of the hub-cap and also the cover thereon against rotation with respect to said journal spindle.

5. In a device of the class described, the combination with a wheel and journal spindle, of a hub-cap comprising a body adapted to be secured to the hub of the wheel and a cover threaded on said body, a rigid clutch member attached to said journal spindle and a second clutch member slidable axially in said cover and adapted when engaged with said rigid clutch member to secure the body of the hub-cap and also the cover thereon against rotation, and a shoulder on said body designed to engage said rigid clutch member and prevent the removal of said body from the wheel.

6. In a device of the class described, the combination with a wheel and journal spindle, of a hub-cap comprising a body adapted to be secured to the hub of the wheel and a cover threaded on said body, said body and cover being respectively provided with recesses and grooves which register with each other, a clutch member rigidly secured upon said spindle and having notches therein, a second clutch member slidable in the cover and supplied with lugs adapted to simultaneously engage said grooves, recesses and notches to thereby secure said body and cover against rotation.

7. In a device of the class described, the combination with a wheel and journal spindle, of a hub-cap secured upon the hub of said wheel, a rigid clutch member within said hub-cap attached to said journal spindle, a movable clutch member also within said hub-cap secured against rotation with respect thereto, a spring to slide said clutch member into engagement with said rigid clutch member, a key-controlled mechanism for locking said slidable clutch member in positions in and out of engagement with the rigid clutch member, and a key for said mechanism serving also as a pull to return the slidable clutch member against the action of said spring.

8. In a device of the class described, the combination with a wheel and journal spindle, of a clutch member fixed against rotation of said spindle, a hub-cap on the wheel inclosing said clutch member, an axially slidable co-acting clutch member also within said hub-cap and secured against rotation with respect thereto and a key-controlled mechanism in said hub-cap attached to and slidable with said second mentioned clutch member, said mechanism, including a spring-pressed latch-bolt, adapted to engage the hub-cap at predetermined points and lock said slidable clutch member in different positions therein.

9. A lock for the wheel of a motor vehicle, comprising a member mounted within the hub cap to move into locking engagement with the axle nut to lock the wheel against rotation, and means for moving said member into locking engagement with said nut.

10. In combination with an axle nut and a hub cap, a locking member located in said cap and movable into and out of locking engagement with said axle nut to lock the wheel against rotation.

11. A vehicle locking device, comprising a member that is adapted to be mounted on the hub of a wheel over the spindle on which the wheel turns, a locking element on said member that is adapted to coöperate with a part carried by the wheel spindle to lock the wheel, and a key-controlled means arranged in the outer end of said body member beyond the end of the spindle for governing the position of said locking element.

Whereof, I have hereunto subscribed my name to this specification.

GERALD R. O'BRIEN.